United States Patent
Chang

(10) Patent No.: US 8,054,381 B2
(45) Date of Patent: Nov. 8, 2011

(54) APPARATUS AND METHOD FOR FRAME RATE UP CONVERSION

(75) Inventor: Fang Chen Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1209 days.

(21) Appl. No.: 11/749,922

(22) Filed: May 17, 2007

(65) Prior Publication Data

US 2008/0284908 A1    Nov. 20, 2008

(30) Foreign Application Priority Data

May 16, 2007   (TW) ............................... 96117333 A

(51) Int. Cl.
*H04N 7/01* (2006.01)
*H04N 11/20* (2006.01)

(52) U.S. Cl. ........................................ 348/459; 348/443

(58) Field of Classification Search .................. 348/459, 348/448–452, 699, 700, 443, 441
See application file for complete search history.

(56) References Cited

U.S. PATENT DOCUMENTS

| 6,900,846 B2 * | 5/2005 | Lee et al. ...................... 348/459 |
| 2003/0086498 A1 * | 5/2003 | Lee et al. ................. 375/240.16 |
| 2004/0252759 A1 | 12/2004 | Winder et al. |

OTHER PUBLICATIONS

Taiwanese Office Action dated Oct. 21, 2010 for 096117333, which is a counterpart Taiwanese application, that cites US20040252759A1.

* cited by examiner

*Primary Examiner* — Michael Lee
(74) *Attorney, Agent, or Firm* — WPAT, P.C.; Anthony King

(57) ABSTRACT

An apparatus for frame rate up conversion comprises a motion-compensated frame rate converter, a primitive frame rate converter and a determination circuit. The determination circuit designates either the motion-compensated frame rate converter or the primitive frame rate converter to output an interpolated frame according to an index that estimates an output quality of the motion-compensated frame rate converter.

12 Claims, 4 Drawing Sheets

APPARATUS AND METHOD FOR FRAME RATE UP CONVERSION

BACKGROUND OF THE INVENTION

1. Field of the Invention

The present invention relates to video processing, and more particularly relates to an apparatus and a method for frame rate up conversion.

2. Description of the Related Art

To support high frame rate display, it may need to convert a received low frame rate video signals, e.g. 60 Hz, into a high frame rate video signal, e.g. 120 Hz.

In frame rate up conversion (FRUC), interpolated frames are created using received frames as references. Currently, frame interpolation may be obtained based on motion vectors of the received frames such that moving objects within the interpolated frame may be correctly positioned.

Although motion-compensated frame rate up conversion (MC-FRUC) offers some advantages in most cases, it also suffers artifacts when motion estimation is incorrect. In particular, motion estimation is never easy when the received frames are complex or speedy.

Accordingly, there is a need to determine whether the motion-compensated frame rate up conversion is quality or not. Furthermore, when the motion-compensated frame rate up conversion is not quality enough, another primitive frame rate up conversion, such as frame averaging or frame repetition, can be used as a substitute.

SUMMARY OF THE INVENTION

An objective of the present invention is to provide an apparatus and a method for frame rate up conversion that displays a high-frame-rate video signal in an improved way. By determining whether the motion-compensated frame rate converter is quality or not, the apparatus for frame rate up conversion can selectively use a motion-compensated frame rate converter or a primitive frame rate converter so as to provide superior output quality.

In order to achieve the objective, the present invention discloses an apparatus for frame rate up conversion. The apparatus comprises a motion-compensated frame rate converter, a primitive frame rate converter and determination circuit. The determination circuit designates either the motion-compensated frame rate converter or the primitive frame rate converter to output an interpolated frame according to an index that evaluates the output quality of the motion-compensated frame rate converter.

In another embodiment, the present invention discloses a method for frame rate up conversion. First, an index evaluating the output quality of motion-compensated frame rate conversion is calculated. An interpolated frame is outputted by selecting one of the motion-compensated frame rate conversion and a primitive frame rate conversion according to the index.

BRIEF DESCRIPTION OF THE DRAWINGS

The invention will be described according to the appended drawings in which.

DETAILED DESCRIPTION OF THE INVENTION

Figure 1:
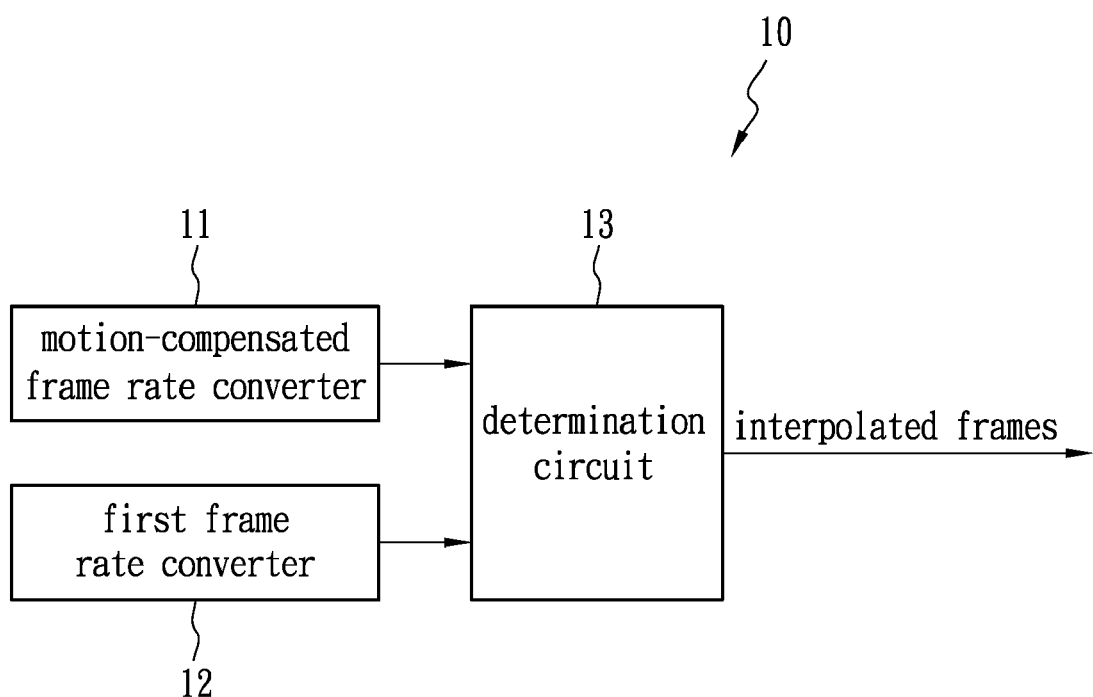
FIG. 1 shows a function block diagram of an apparatus for frame rate up conversion in accordance with the present invention.

FIG. 1 shows a function block diagram of an apparatus 10 for frame rate up conversion in accordance with the present invention. The apparatus 10 comprises a motion-compensated frame rate converter 11, a primitive frame rate converter 12 and determination circuit 13. The determination circuit 13 can designate either the motion-compensated frame rate converter 11 or the primitive frame rate converter 12 to output an interpolated frame according to an index that evaluates the output quality of the motion-compensated frame rate converter 11. The index may be obtained by counting the frequency of disqualified motion vectors in edging regions of a motion-compensated interpolated frame output by the motion-compensated frame rate converter 11, assigning a quality flag of the motion-compensated interpolated frame based on the frequency, and accumulating a grade as the index based on a plurality of quality flags for a succession of motion-compensated interpolated frames.

Figure 2:
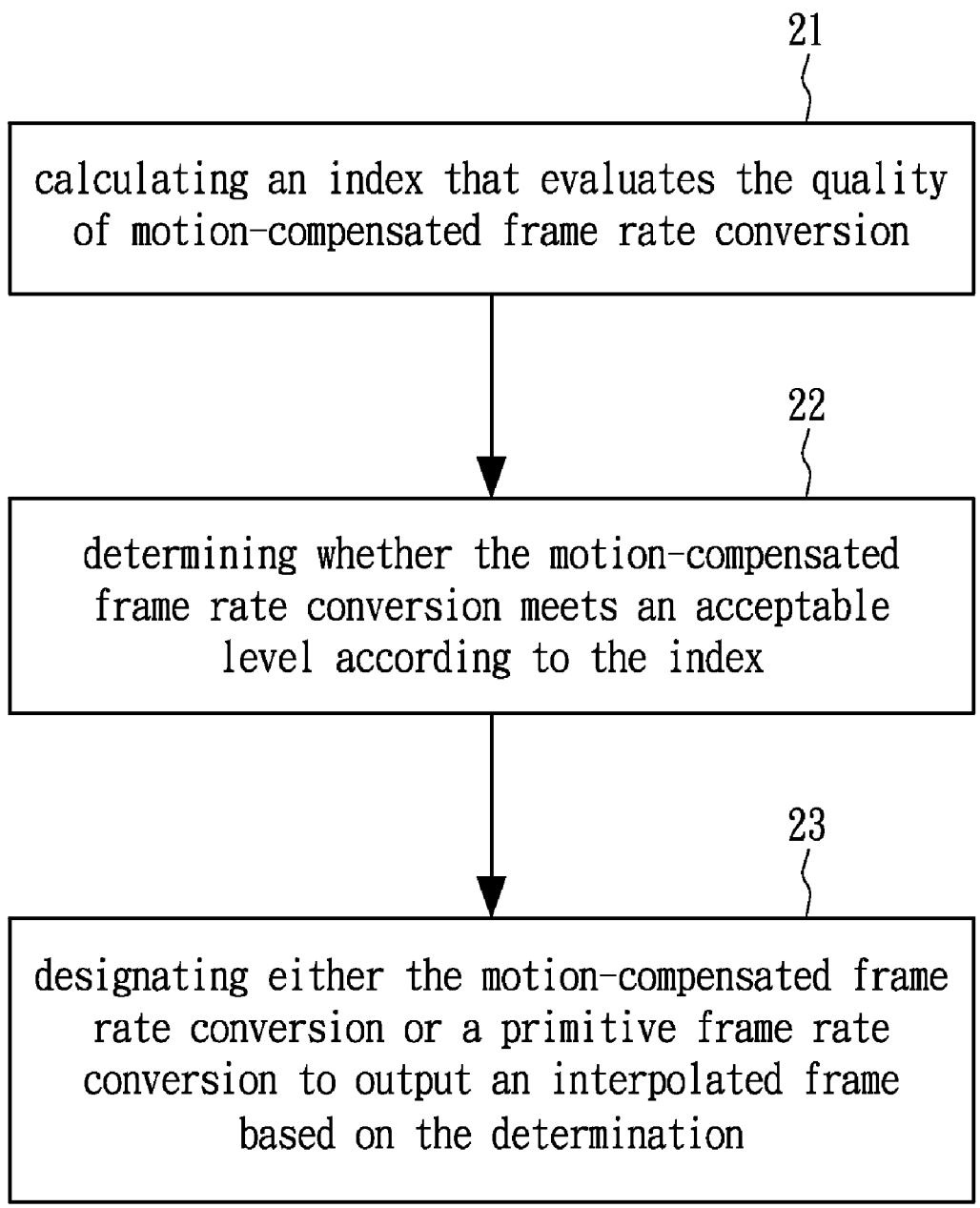
FIG. 2 shows a flow chart of a method for frame rate up conversion in accordance with the present invention.

FIG. 2 shows a flow chart of a method for frame rate up conversion in accordance with the present invention. Referring to Step 21, an index that evaluates the output quality of the motion-compensated frame rate conversion is calculated. The index may be obtained by calculating the frequency of disqualified motion vectors in edging regions of a motion-compensated interpolated frame output by the motion-compensated frame rate conversion, assigning a quality flag to the motion-compensated interpolated frame based on the frequency, and accumulating a grade as the index based on a plurality of quality flags for a succession of motion-compensated interpolated frames. As shown in Step 22, the conversion method determines whether the output quality of the motion-compensated frame rate conversion meets an acceptable level according to the index. That is, the output quality of the motion-compensated frame rate conversion is evaluated to be in an acceptable state or in a disqualified state. Afterward, as shown in Step S23, either the motion-compensated frame rate conversion or a primitive frame rate conversion that is likely to implement frame averaging or frame repetition is adaptively designated to output a more adequate interpolated frame based on the determination.

Figure 3:
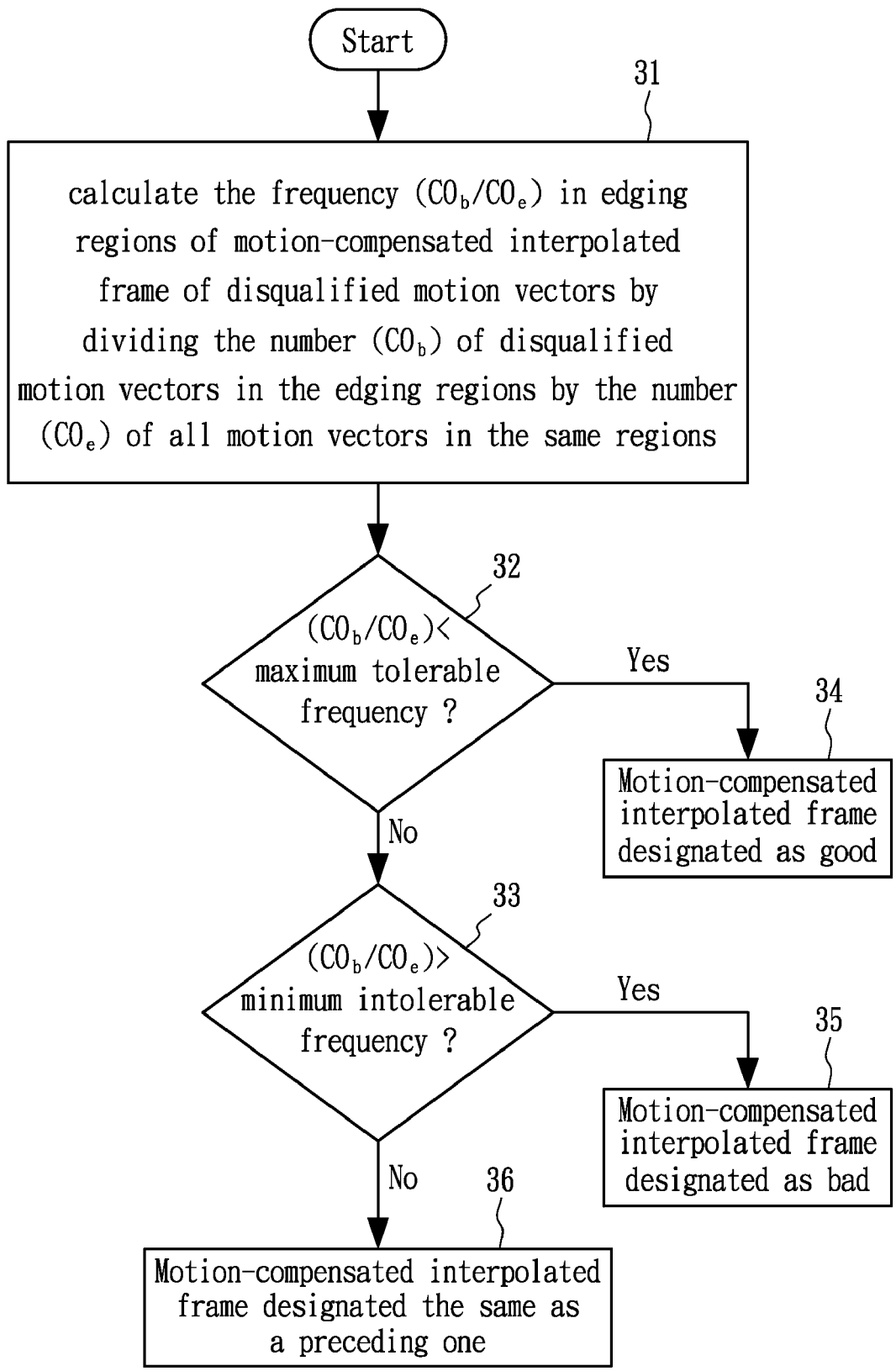
FIG. 3 shows a flow chart exemplifying how to counting the frequency of disqualified motion vectors in edging regions of a motion-compensated interpolated frame output by the motion-compensated frame rate converter 11 and assign a quality flag to the motion-compensated interpolated frame based on the frequency in accordance with the present invention.

FIG. 3 shows a flow chart exemplifying how to count the frequency of disqualified motion vectors in edging regions of a motion-compensated interpolated frame output by the motion-compensated frame rate conversion and assign a quality flag to the motion-compensated interpolated frame based on the frequency in accordance with the present invention. As shown in Step 31, the frequency of disqualified motion vectors in edging regions of a motion-compensated interpolated frame output by the motion-compensated frame rate conversion may be obtained by dividing the number $CO_b$ of disqualified motion vectors within edging regions of the motion-compensated interpolated frame output by the motion-compensated frame rate conversion by the number $CO_e$ of all motion vectors in the same regions. As an example, a motion vector may be evaluated as a disqualified motion vector if the sum of absolute difference (SAD) value between corresponding macroblocks in the motion-compensated interpolated frame and its reference frame is larger than a threshold. Moreover, edging regions of the motion-compensated interpolated frame may be also detected by known edge detection techniques, which will not be described herein for simplicity. When the frequency of disqualified motion vectors is smaller than a first level, a "G (good)" quality flag is assigned to the motion-compensated interpolated frame, as shown in Steps 32 and 34. For example, if the frequency of disqualified motion vectors is smaller than 60% representing a maximum tolerable frequency, the quality of the motion-compensated interpolated frame is acceptable and a "G (good)" quality flag is assigned thereto. When the frequency of disqualified motion vectors is larger than a second level, a "B (bad)" qualify flag is assigned to the motion-compensated interpolated frame, as shown in Steps 33 and 35. For example, if the frequency of disqualified motion vectors is larger than 70% representing a minimum intolerable frequency, the quality of the motion-compensated interpolated frame is intolerable and a "B (bad)" quality flag is assigned thereto. As shown in Step 36, when the frequency of disqualified motion vectors happens to be lower than the maximum tolerable frequency and higher than the minimum intolerable frequency, the quality of the motion-compensated interpolated frame is hard to decide and a quality flag being the same as that assigned to the preceding motion-compensated interpolated frame is assigned thereto.

Figure 4:
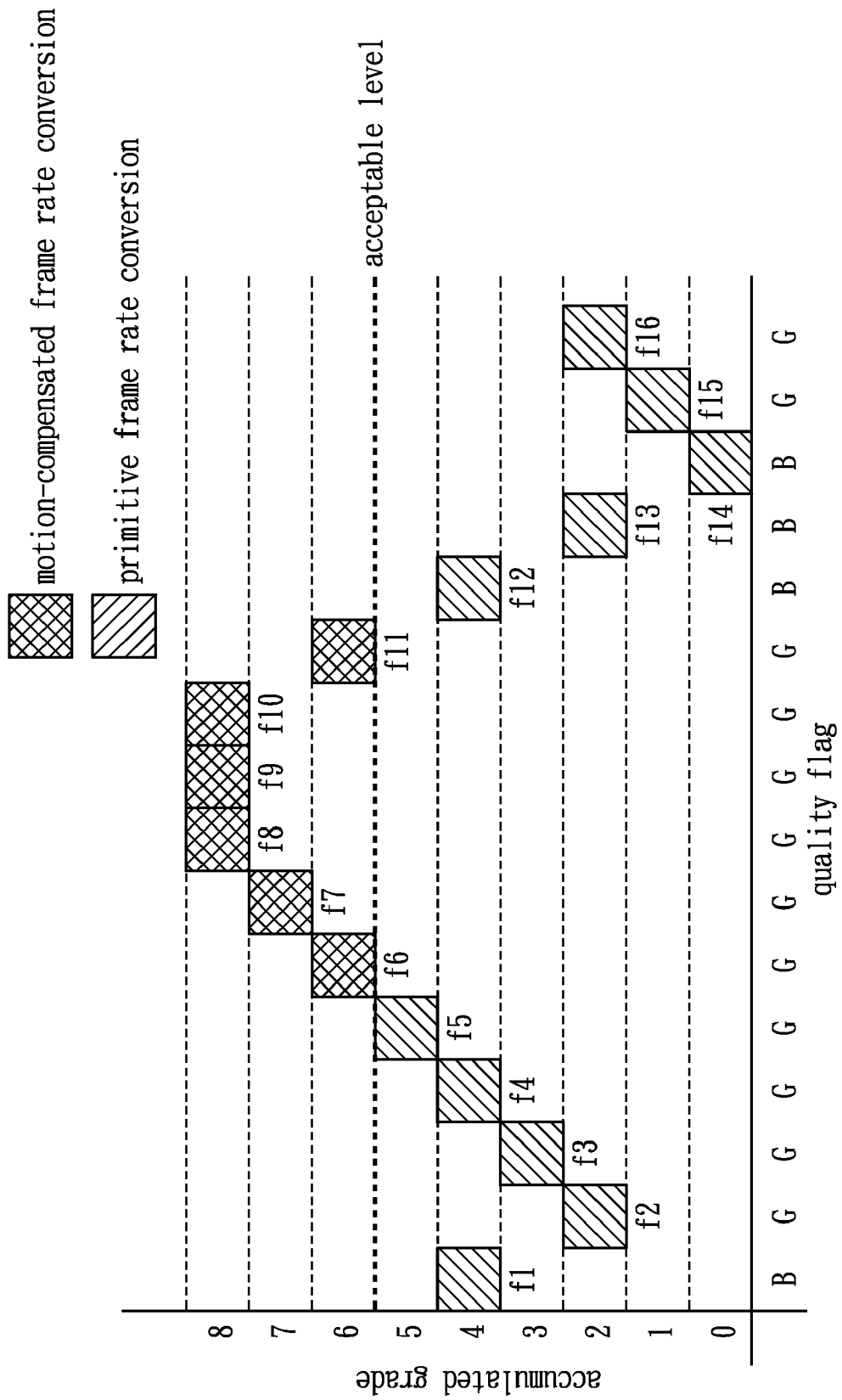
FIG. 4 shows a diagram explaining how to accumulate a grade based on quality flags for a succession of motion-compensated interpolated frames in accordance with the present invention.

FIG. 4 shows a diagram explaining how to accumulate a grade as the index based on quality flags for a succession of motion-compensated interpolated frames. Suppose frames f1-f16 are successive interpolated frames output by either the motion-compensated frame rate conversion or a primitive frame rate conversion that is likely to implement frame repetition or frame averaging. Quality flags for the successive motion-compensated interpolated frames output by the motion-compensated frame rate conversion may be recorded.

The index that evaluates the output quality of the motion-compensated frame rate conversion may be obtained by accumulating a grade, e.g. ranging from grade 0 to grade 8, as the index based on the quality flags. If the grade during the first interpolated frame f1 is initialized at the middle, grade 4 in this case, and an acceptable level of the motion-compensated frame rate conversion is defined, for example, between grade 5 and grade 6. When the accumulated grade is increased to be over the acceptable level, the corresponding interpolated frame can be output by the motion-compensated frame rate conversion. Conversely, the corresponding interpolated frame can be output by the primitive frame rate conversion when the accumulated grade is decreased to be under the acceptable level.

Furthermore, in one embodiment, if the motion-compensated interpolated frame is assigned to a "B (bad)" quality flag, the accumulated grade may be decreased by a certain value. As shown in FIG. 4, the accumulated grade during the second interpolated frame f2 is downgraded to grade 2 from grade 4 during the first interpolated frame f1. Conversely, the accumulated grade is increased by a certain value if the motion-compensated interpolated frame is assigned to a "G (good)" quality flag. As shown in FIG. 4, the accumulated grade during the third interpolated frame f3 is upgraded to grade 3 from grade 2 during the second interpolated frame f2. Further, the accumulated grade may be limited in a range, for example, between grade 8 and grade 0. Therefore, if the accumulated grade reaches grade 8, the accumulated grade will remain unchanged at grade 8, even though the next motion-compensated interpolated frame is assigned to a "G (good)" quality flag. Similarly, if the accumulated grade falls to grade 0, the accumulated grade will also remain unchanged at grade 0, even though the next motion-compensated interpolated frame is assigned to a "B (bad)" quality flag.

Using the accumulated grade as the index, when the accumulated grade during an interpolated frame such as the sixth interpolated frame f6 is increased from grade 5 to grade 6 being above the acceptable level, the interpolated frame can be output by the motion-compensated frame rate conversion. Similarly, the interpolated frame can be output by the primitive frame rate conversion when the accumulated grade during the interpolated frame such the twelfth interpolated frame f12 is decreased from grade 6 to grade 4 being under the acceptable level.

Also, it should be noted the decreasing step for the grade accumulation is preferably designed to be larger than the increasing step, such that the interpolated frame may be quickly switched and output by the primitive frame rate conversion when the output quality of the motion-compensated frame rate conversion is not quality enough.

The above-described embodiments of the present invention are intended to be illustrative only. Numerous alternative embodiments may be devised by persons skilled in the art without departing from the scope of the following claims.

What is claimed is:

1. An apparatus for frame rate up conversion, comprising: a motion-compensated frame rate converter performing motion-compensated interpolation; a primitive frame rate converter performing a primitive interpolation; and a determination circuit adaptively designating either the motion-compensated frame rate converter or the primitive frame rate converter to output an interpolated frame,
   wherein the determination circuit outputs the interpolated frame according to an index that evaluates the output quality of the motion-compensated frame rate converter,
   wherein the index is obtained by counting the frequency of disqualified motion vectors in edging regions of a motion-compensated interpolated frame output by the motion-compensated frame rate converter, assigning a quality flag of the motion-compensated interpolated frame according to the frequency, and accumulating a grade as the index based on a plurality of quality flags for a succession of motion-compensated interpolated frames.

2. The apparatus for frame rate up conversion of claim 1, wherein the frequency of disqualified motion vectors is obtained by dividing the number of disqualified motion vectors in the edging regions by the number of all motion vectors in the same regions, and the disqualified motion vectors are sustained if the sum of absolute difference (SAD) value between corresponding macroblcoks in the motion-compensated interpolated frame and its reference frame is larger than a threshold.

3. The apparatus for frame rate up conversion of claim 1, wherein the quality flag is designate as good if the frequency is lower than a maximum tolerable frequency, designate as bad if the frequency is higher than a minimum intolerable frequency, and remains the same as that of a preceding motion-compensated interpolated frame if the frequency is between the maximum tolerable frequency and the minimum intolerable frequency.

4. The apparatus for frame rate up conversion of claim 3, wherein the grade is increased if the corresponding quality flag is designated as good or decreased if the corresponding quality flag is designated as bad.

5. The apparatus for frame rate up conversion of claim 4, wherein the grade is increased by a first step if the corresponding quality flag is designated as good or decreased by a second step larger than the first step if the corresponding quality flag is designated as bad.

6. The apparatus for frame rate up conversion of claim 1, wherein the primitive frame rate converter is provide to implement frame repetition or frame averaging.

7. A method for frame rate up conversion, comprising the steps of:

calculating an index that evaluates the quality of motion-compensated frame rate conversion; determining whether the motion-compensated frame rate conversion meets an acceptable level according to the index; and designating either the motion-compensated frame rate conversion or a primitive frame rate conversion to output an interpolated frame based on the determination, wherein the index is obtained by counting the frequency of disqualified motion vectors in edging regions of a motion-compensated interpolated frame output by the motion-compensated frame rate conversion, assigning a quality flag of the motion-compensated interpolated frame according to the frequency, and accumulating a grade as the index based on a plurality of quality flags for a succession of motion-compensated interpolated frames.

8. The method for frame rate up conversion of claim 7, wherein the frequency of disqualified motion vectors is obtained by dividing the number of disqualified motion vectors in the edging regions by the number of all motion vectors in the same regions, and the disqualified motion vectors are sustained if the sum of absolute difference (SAD) values between corresponding macroblocks in the motion-compensated interpolated frame and its reference frame is larger than a threshold.

9. The method for frame rate up conversion of claim 7, wherein the quality flag is designated as good if the frequency is lower than a maximum tolerable frequency, designated as bad if the frequency is higher than a minimum intolerable frequency, and remains the same as that of a preceding motion-compensated interpolated frame if the frequency is between the maximum tolerable frequency and the minimum intolerable frequency.

10. The method for frame rate up conversion of claim 9, wherein the grade is increased if the corresponding quality flag is designated as good or decreased if the corresponding quality flag is designated as bad.

11. The method for frame rate up conversion of claim 10, wherein the grade is increased by a first step if the corresponding quality flag is designated as good or decreased by a second step larger than the first step if the corresponding quality flag is designated as bad.

12. The method for frame rate up conversion of claim 7, wherein the primitive frame rate conversion is provided to implement frame repetition or frame averaging.

\* \* \* \* \*